United States Patent
Seagle et al.

(10) Patent No.: US 11,646,053 B2
(45) Date of Patent: May 9, 2023

(54) TAPE HEAD DESIGN HAVING SAME GAP VERIFY CAPABILITIES

(71) Applicant: Western Digital Technologies, Inc., San Jose, CA (US)

(72) Inventors: David J. Seagle, Morgan Hill, CA (US); Alexander Goncharov, Morgan Hill, CA (US); Robert G. Biskeborn, Hollister, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/355,590

(22) Filed: Jun. 23, 2021

(65) Prior Publication Data
US 2022/0415355 A1 Dec. 29, 2022

(51) Int. Cl.
| G11B 5/48 | (2006.01) |
| G11B 5/265 | (2006.01) |
| G11B 5/29 | (2006.01) |
| G11B 5/008 | (2006.01) |
| G11B 5/23 | (2006.01) |

(Continued)

(52) U.S. Cl.
CPC ........ *G11B 5/3967* (2013.01); *G11B 5/00817* (2013.01); *G11B 5/23* (2013.01); *G11B 5/265* (2013.01); *G11B 5/29* (2013.01); *G11B 5/3958* (2013.01); *G11B 5/4893* (2013.01); *G11B 5/11* (2013.01); *G11B 15/46* (2013.01)

(58) Field of Classification Search
None
See application file for complete search history.

(56) References Cited

U.S. PATENT DOCUMENTS

| 3,806,902 A | 4/1974 | Drees et al. |
| 4,636,902 A | 1/1987 | Dalziel et al. |

(Continued)

FOREIGN PATENT DOCUMENTS

| EP | 0747888 B1 | 9/2001 |
| EP | 1369865 A2 | 12/2003 |
| WO | 0137276 A1 | 5/2001 |

OTHER PUBLICATIONS

Wang, Zhi Gang et al., "Crossfeed Problems in Read-While-Write Tape Heads", IEEE Transactions on Magnetics, vol. 33, No. 4, Jul. 4, 1997, pp. 2531-2537.

(Continued)

*Primary Examiner* — Craig A. Renner
(74) *Attorney, Agent, or Firm* — Patterson + Sheridan, LLP; Steven H. VerSteeg

(57) ABSTRACT

The present disclosure generally relates to a tape drive including a tape head. The tape head comprises at least one same gap verify (SGV) module comprising a plurality of write transducer and read transducer pairs disposed on a substrate. In each pair, the write transducer comprises a write pole having a height, and the read transducer comprises a first shield disposed adjacent to the write pole. The write pole and the first shield of each pair are spaced apart a distance greater than or equal to about 20% of the height of the write pole. The SGV module is configured to write data to a tape using the write transducer of each pair and read verify the data written on the tape using the read transducer of each pair such that the write transducer and read transducer of each pair are concurrently operable.

21 Claims, 9 Drawing Sheets

(51) Int. Cl.
    *G11B 5/39*     (2006.01)
    *G11B 15/46*     (2006.01)
    *G11B 5/11*     (2006.01)

(56) References Cited

U.S. PATENT DOCUMENTS

| | | | |
|---|---|---|---|
| 5,940,250 | A | 8/1999 | McNeil et al. |
| 6,038,108 | A | 3/2000 | Dee et al. |
| 6,477,008 | B1 | 11/2002 | Chang et al. |
| 6,826,140 | B2 | 11/2004 | Brommer et al. |
| 7,149,045 | B1* | 12/2006 | Mallary et al. ...... G11B 5/1278 360/55 |
| 7,551,393 | B2 | 6/2009 | Biskeborn et al. |
| 8,089,722 | B2 | 1/2012 | Iben et al. |
| 8,254,058 | B2 | 8/2012 | Biskeborn |
| 9,007,712 | B1 | 4/2015 | Biskeborn et al. |
| 9,129,631 | B1 | 9/2015 | Biskeborn et al. |
| 9,177,580 | B1 | 11/2015 | Vanderheyden et al. |
| 9,218,838 | B2 | 12/2015 | Biskeborn et al. |
| 9,251,844 | B1 | 2/2016 | Wheelock et al. |
| 9,299,368 | B2 | 3/2016 | Biskeborn et al. |
| 10,014,017 | B1 | 7/2018 | Breuer et al. |
| 10,832,712 | B1* | 11/2020 | Seagle et al. ............ G11B 5/29 |
| 10,902,882 | B1 | 1/2021 | Biskeborn |
| 11,087,782 | B1* | 8/2021 | Brown et al. .......... G11B 5/265 |
| 2001/0016271 | A1 | 8/2001 | Aoyama |
| 2003/0214753 | A1 | 11/2003 | Hsu et al. |
| 2005/0018349 | A1 | 1/2005 | Eaton |
| 2005/0036227 | A1 | 2/2005 | Hoerger |
| 2006/0039082 | A1 | 2/2006 | Biskeborn et al. |
| 2006/0092575 | A1 | 5/2006 | Mochizuki et al. |
| 2007/0047122 | A1 | 3/2007 | Czarnecki et al. |
| 2007/0133131 | A1 | 6/2007 | Biskeborn |
| 2007/0146929 | A1 | 6/2007 | Maruyama et al. |
| 2007/0223142 | A1 | 9/2007 | Takekuma et al. |
| 2007/0254189 | A1 | 11/2007 | Nakagawa et al. |
| 2008/0151436 | A1 | 6/2008 | Sato et al. |
| 2008/0316632 | A1 | 12/2008 | Czarnecki et al. |
| 2009/0168241 | A1 | 7/2009 | Mochizuki et al. |
| 2011/0222187 | A1 | 9/2011 | Biskeborn |
| 2013/0100554 | A1 | 4/2013 | Biskeborn et al. |
| 2014/0198403 | A1 | 7/2014 | Biskeborn et al. |
| 2015/0138673 | A1 | 5/2015 | Adrong et al. |
| 2015/0262596 | A1 | 9/2015 | Zuckerman et al. |
| 2020/0219531 | A1 | 7/2020 | Biskeborn et al. |

OTHER PUBLICATIONS

Biskeborn, Robert G. et al., "TMR tape drive for a 15 TB cartridge", AIP Publishing, Dec. 2017, https://aip.scitation.org/doi/10.1063/1.5007788, Last accessed Jun. 22, 2021.

Storage Networking Fundamentals: Storage Devices, Cisco Press, Mar. 4, 2005, pp. 1-4, https://www.ciscopress.com/articles/article.asp?p=372010&seqNum=2, Last accessed Mar. 15, 2021.

International Search Report and the Written Opinion for International Application No. PCT/US2021/035171 dated Aug. 29, 2021, 13 pages.

* cited by examiner

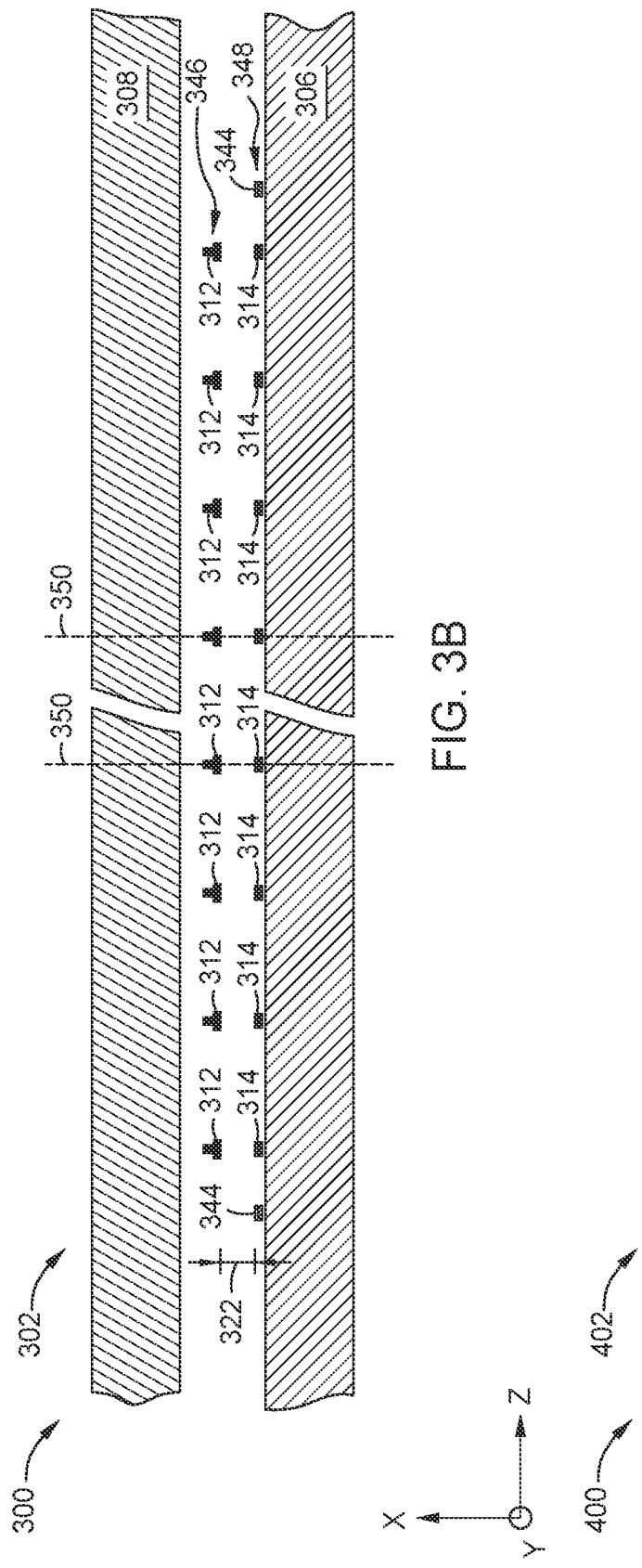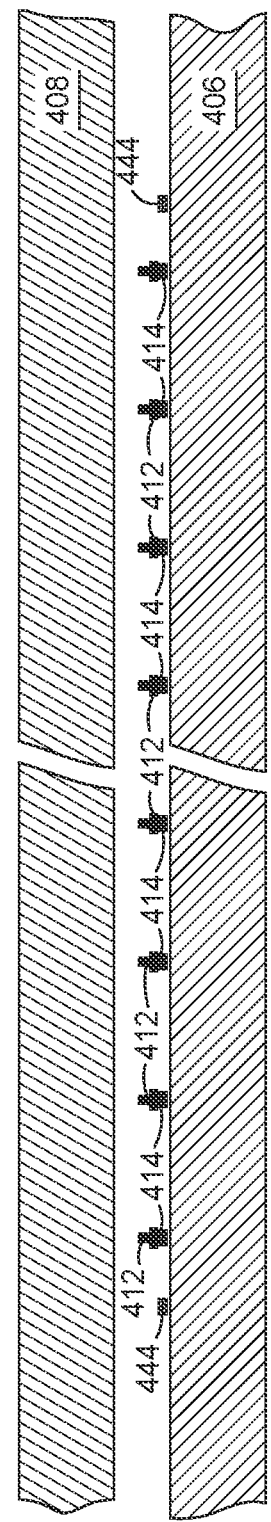

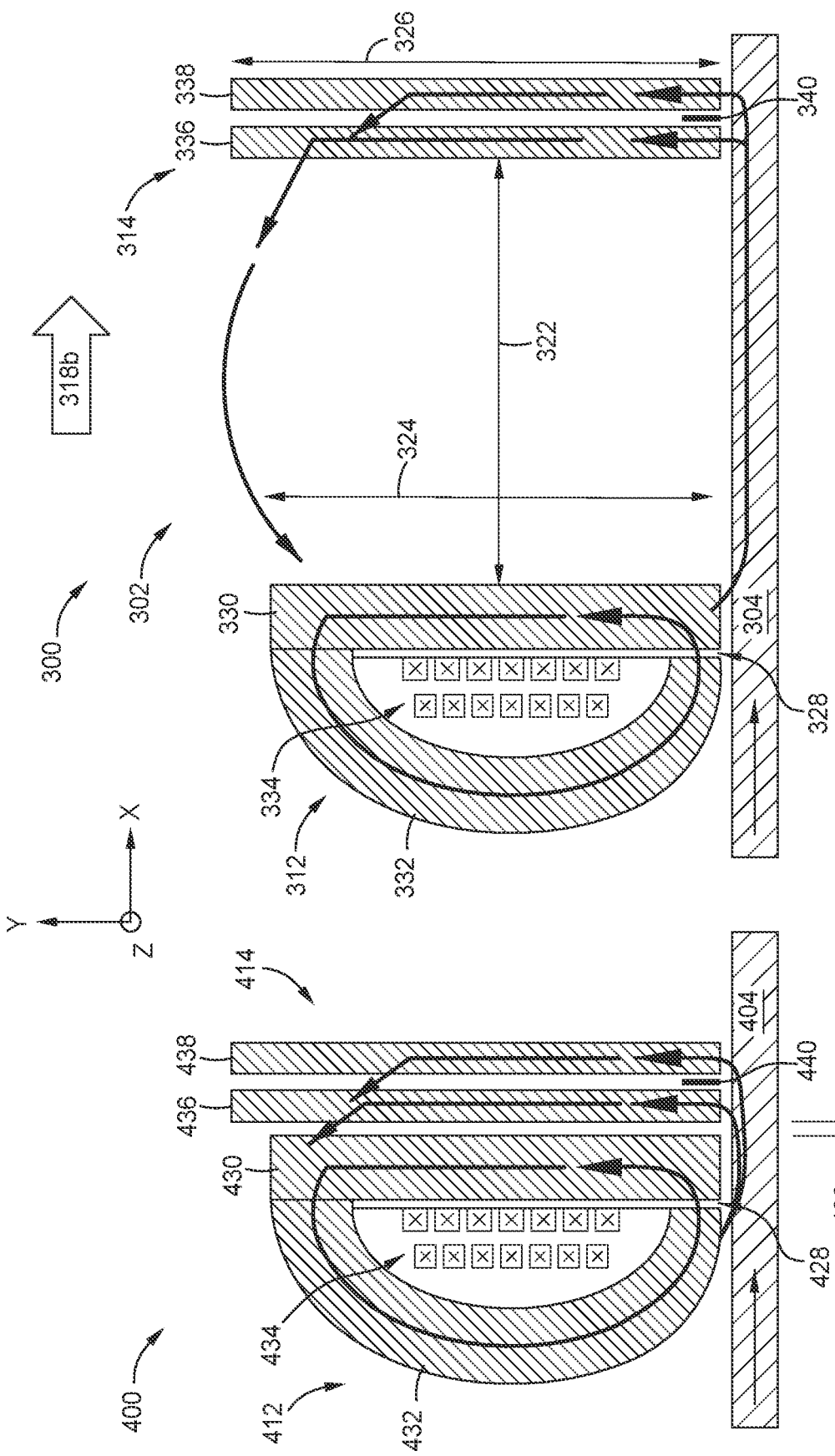

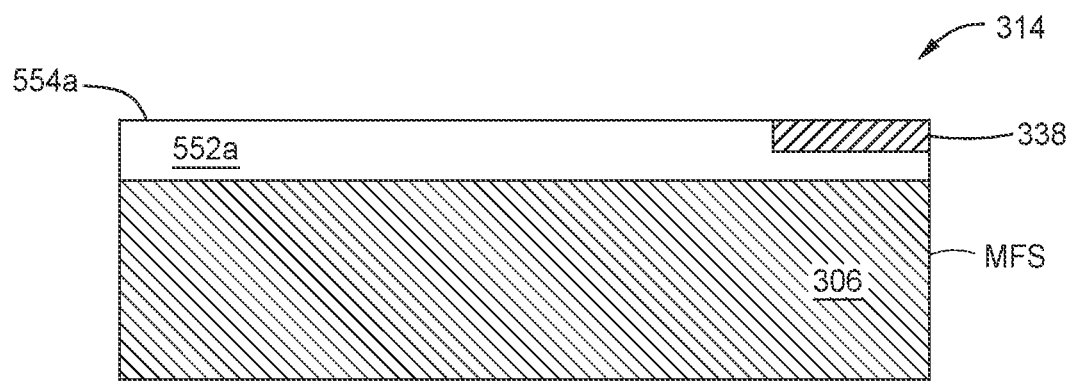
FIG. 5A
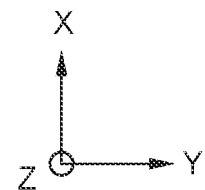
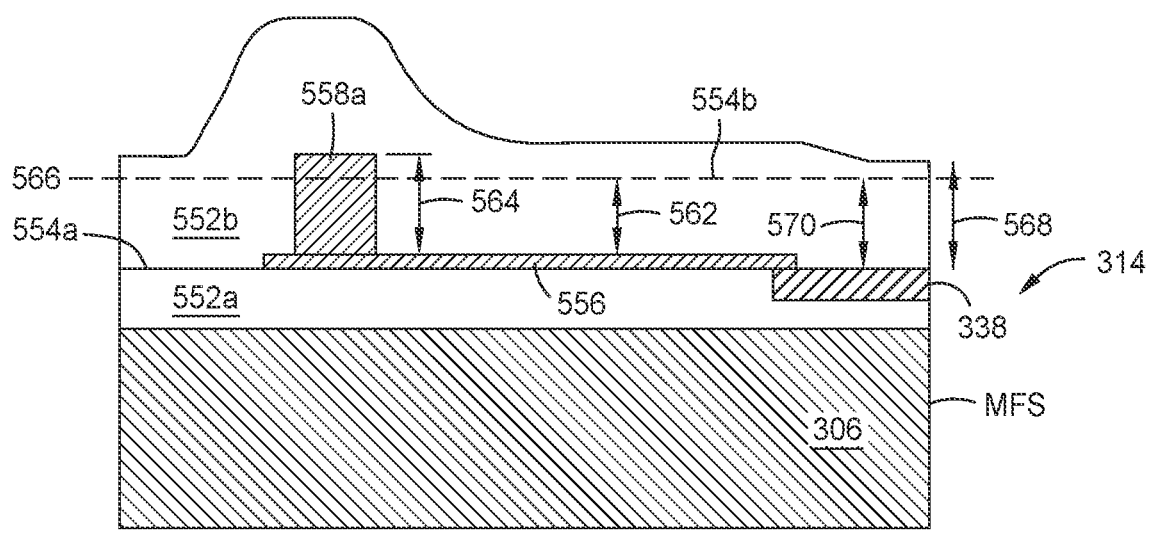
FIG. 5B

TAPE HEAD DESIGN HAVING SAME GAP VERIFY CAPABILITIES

BACKGROUND OF THE DISCLOSURE

Field of the Disclosure

Embodiments of the present disclosure generally relate to a tape head and a tape head drive including a tape head.

Description of the Related Art

Tape heads of tape drive systems are used to record and read back information on tapes by magnetic processes. Magnetic transducers of the tape heads read data from and write data onto magnetic recording media. Data is written on the magnetic recording media by moving a magnetic write transducer to a position over the media where the data is to be stored. The magnetic write transducer then generates a magnetic field, which encodes the data into the magnetic media. Data is read from the media by similarly positioning the magnetic read transducer and then sensing the magnetic field of the magnetic media.

In a tape drive system, the quantity of data stored on a magnetic tape may be increased by increasing the number of data tracks across the tape that the tape head is capable of writing to. By overlapping portions of data tracks (e.g., shingling data tracks), improvements to data storage quantities can be achieved. However, for various reasons, enabling read-verify for conventional tape heads requires use of two or more separate head structures, where one structure write the data and the other read-verifies the data. A drawback is that the separate structures in conventional heads must be very precisely assembled to enable this function. Another drawback is that the heads are more susceptible to mis-registration between reader and upstream writer caused by tape skew, as a result of the unavoidable separation between the two. Yet another drawback is the time delay between the writing and the read-verifying may lead to a loss of data due to having to re-write larger blocks of data when an uncorrectable error occurs.

Therefore, there is a need in the art for a tape head configured to write and read verifying data within a single head structure.

SUMMARY OF THE DISCLOSURE

The present disclosure generally relates to a tape drive including a tape head. The tape head comprises at least one same gap verify (SGV) module comprising a plurality of write transducer and read transducer pairs disposed on a substrate. In each pair, the write transducer comprises a write pole having a height, and the read transducer comprises a first shield disposed adjacent to the write pole. The write pole and the first shield of each pair are spaced apart a distance greater than or equal to about 20% of the height of the write pole. The SGV module is configured to write data to a tape using the write transducer of each pair and read verify the data written on the tape using the read transducer of each pair such that the write transducer and read transducer of each pair are concurrently operable.

In one embodiment, a SGV module head assembly comprises a substrate and a plurality of write transducer and read transducer pairs disposed on the substrate, each write transducer and read transducer pair comprising a write transducer and a read transducer, wherein: each write transducer comprises a write pole having a first height in a first direction from a media facing surface, each read transducer comprises a first shield disposed adjacent to the write pole, a second shield, and a magnetic sensor disposed between the first and second shields, and the write pole and the first shield of each pair are spaced a first distance in a second direction perpendicular to the first direction greater than or equal to about 20% of the first height such that the SGV module head assembly is controllable to write first data to a tape using the write transducer of each pair and read verify the first data using the read transducer of each pair.

In another embodiment, a tape head comprises a first SGV module head assembly comprising: a plurality of first write transducers disposed in a first row on a substrate, each first write transducer comprising a write pole having a first height in a first direction, and a plurality of first read transducers disposed in a second row adjacent to the first row on the substrate, each first read transducer comprising a first shield having a second height in the first direction from a media facing surface, a second shield, and a magnetic sensor disposed between the first and second shield, wherein: each first write transducer of the plurality of first write transducers is paired with an adjacent first read transducer of the plurality of first read transducers to form a plurality of first write transducer and first read transducer pairs, in each first write transducer and first read transducer pair, the write pole is disposed adjacent to and spaced from the first shield a first distance in a second direction perpendicular to the first direction, and the first distance is greater than or equal to about one-fifth of the second height such that the first SGV module head assembly is controllable to write first data to a tape using the first write transducer of each pair and read verify the first data using the first read transducer of each pair.

In yet another embodiment, a method of forming a SGV module head assembly comprises depositing a first dielectric layer over a substrate, polishing the first dielectric layer a first substantially flat surface, forming a read transducer at a media facing surface over the first substantially flat surface, depositing one or more second dielectric layers over the read transducer, polishing the one or more second dielectric layers to form a second substantially flat surface, and forming a write transducer at the media facing surface on the second substantially flat surface at the media facing surface, wherein the SGV module head assembly is controllable to write data to a tape using the write transducer and to read verify the data using the read transducer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3B illustrate illustrates a media facing surface (MFS) view of the tape head comprising the two SGV module head assemblies of FIG. 3A, according to one embodiment.

FIG. 3C illustrates a write transducer and a read transducer pair of a SGV module of the tape head of FIGS. 3A-3B, according to one embodiment.

FIGS. 4A-4B illustrate a conventional tape head that is not configured to write and read verify data, according to one embodiment.

FIGS. 5A-5D illustrate various stages of forming a SGV module head assembly of the tape head of FIGS. 3A-3C, according to various embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a tape drive including a tape head. The tape head comprises at least one same gap verify (SGV) module comprising a plurality of write transducer and read transducer pairs disposed on a substrate. In each pair, the write transducer comprises a write pole having a height, and the read transducer comprises a first shield disposed adjacent to the write pole. The write pole and the first shield of each pair are spaced apart a distance greater than or equal to about 20% of the height of the write pole. The SGV module is configured to write data to a tape using the write transducer of each pair and read verify the data written on the tape using the read transducer of each pair such that the write transducer and read transducer of each pair are concurrently operable.

Figure 1A:
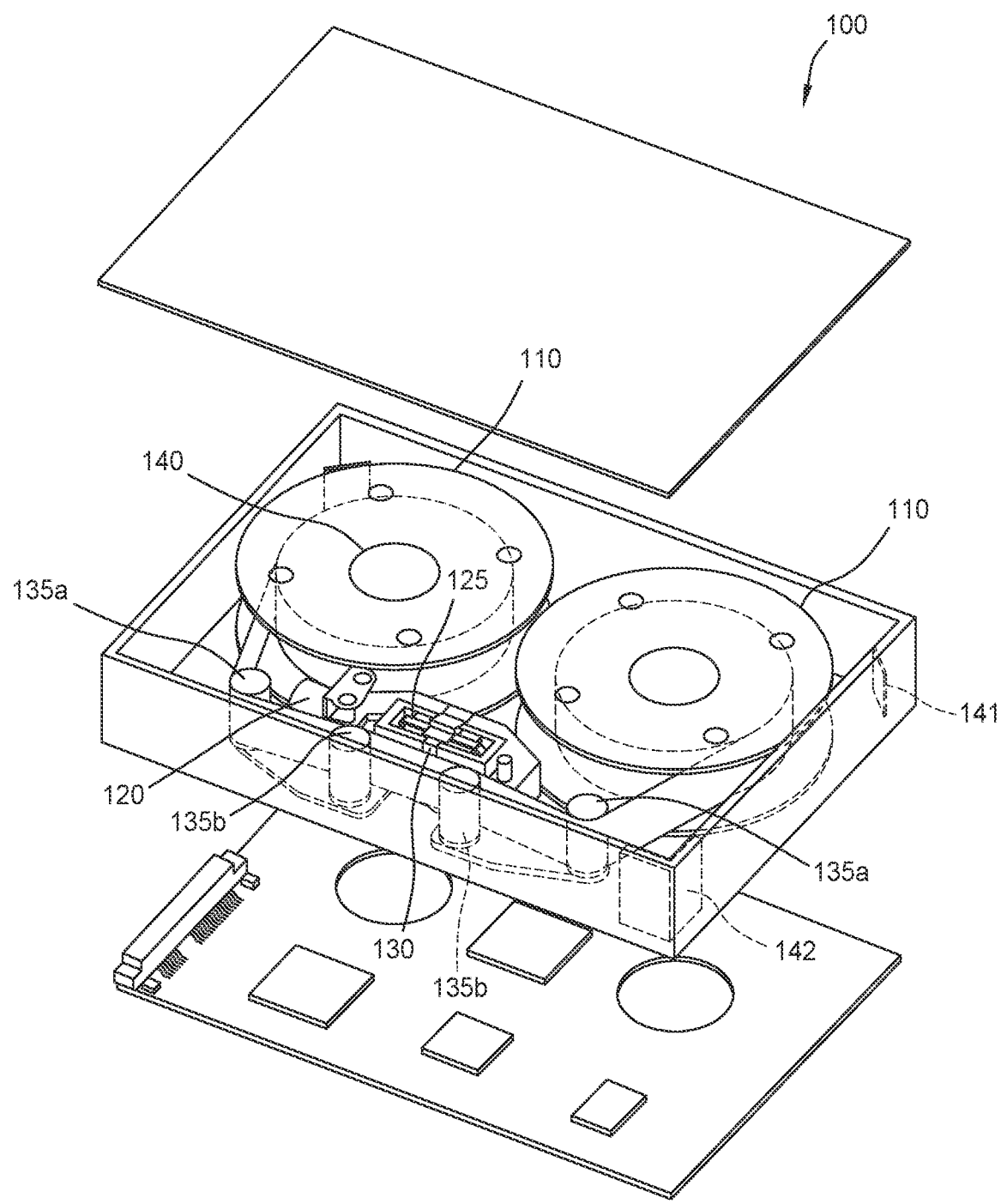
FIGS. 1A-1C illustrate a perspective exploded view, a simplified top down, and side profile view of a tape embedded drive, in accordance with some embodiments.
Figure 1B:
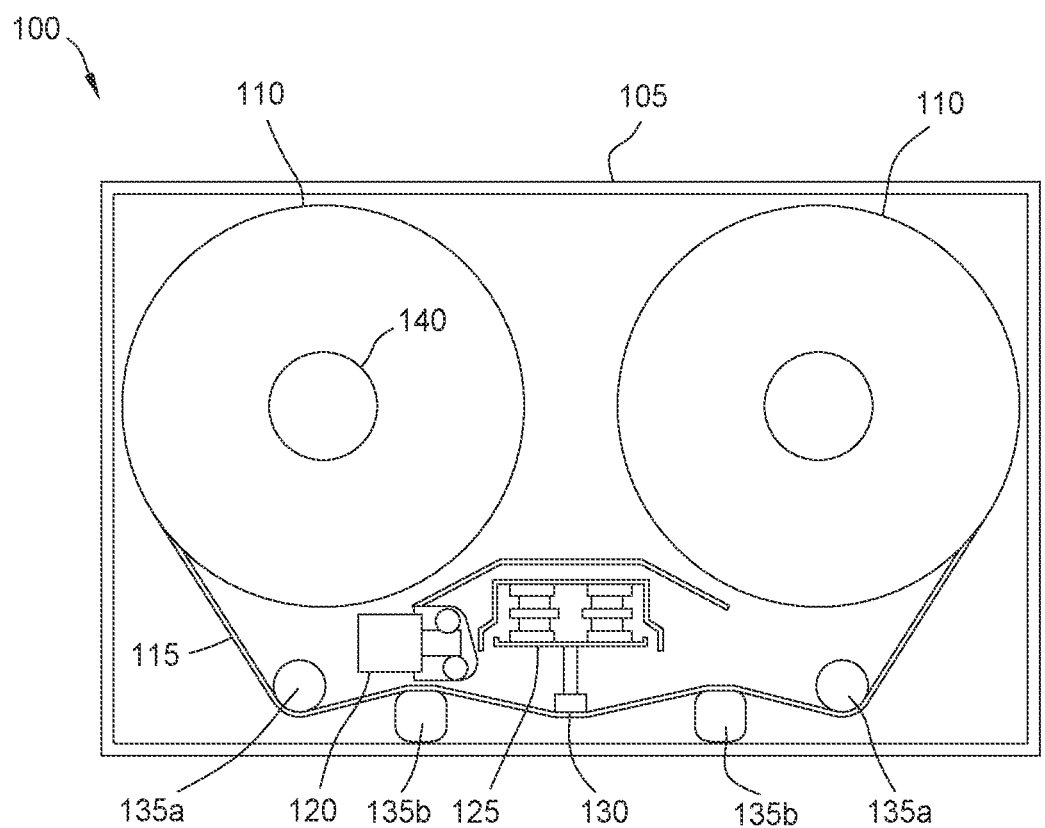
Figure 1C:
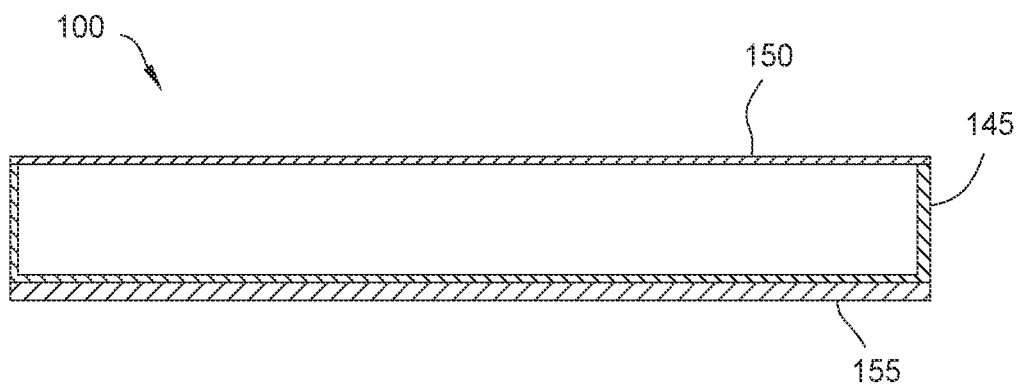

FIGS. 1A-1C illustrate a perspective exploded view, a simplified top down, and side profile view of a tape embedded drive (TED) 100, in accordance with some embodiments. Focusing on FIG. 1B, for example, the tape embedded drive comprises a casing 105, one or more tape reels 110 on rotatable poles 140, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape embedded drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. Each tape reel 110 may also incorporate a tape folder to help the tape media 115 be neatly wound onto the reel 110. One or more of the tape reels 110 may form a part of a removable cartridge and are not necessarily part of the tape embedded drive 100. In such embodiments, the tape embedded drive 100 may no longer be a tape embedded drive as it does not have embedded media, the drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape embedded drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape embedded drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape embedded drive. For example, the drive 100 may be hermetically sealed for environmental control by attaching (e.g., laser welding, adhesive, etc.) the cover 150 to the base 145. The drive 100 may be filled by helium, nitrogen, hydrogen, or any other typically inert gas.

In some embodiments, other components may be added to the tape embedded drive 100. For example, a pre-amp for the heads may be added to the tape embedded drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

In various embodiments, the drive 100 includes controller integrated circuits (IC) (or more simply "a controller") (e.g., in the form of one or more System on Chip (SoC)), along with other digital and/or analog control circuitry to control the operations of the drive. For example, the controller and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller. As an example, the controller may be configured to execute firmware instructions for the various same gap verify embodiments described below.

Figure 2:
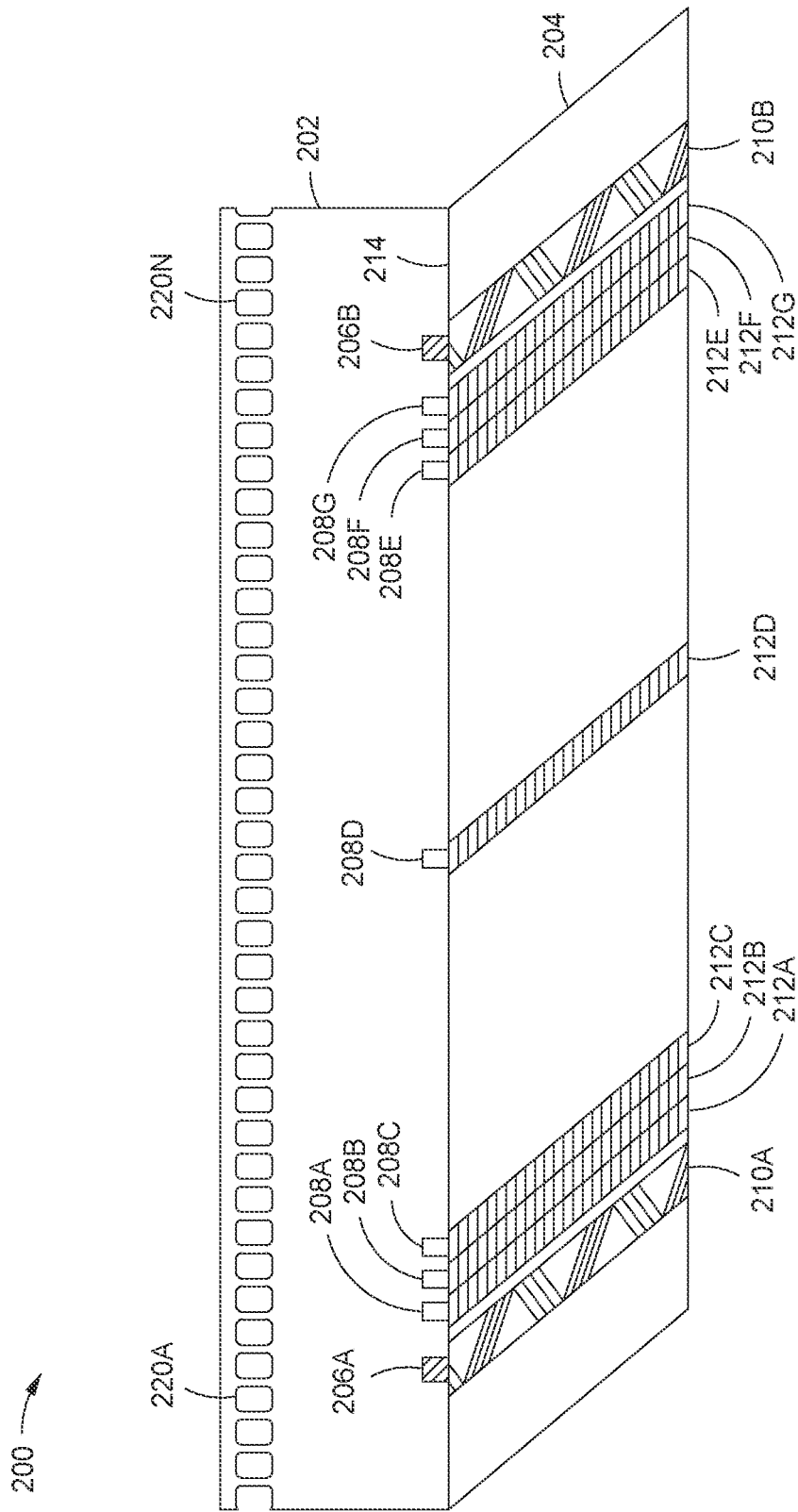
FIG. 2 is a schematic illustration of a tape head and tape that are aligned.

FIG. 2 is a schematic illustration of a tape head module 200 and a tape 204 that are aligned. The tape head module 200 comprises a tape head body 202 that is aligned with the tape 204. The tape 204 moves past the tape head module 200 during read and/or write operations. The tape head module 200 has a media facing surface (MFS) 214 that faces the tape 204.

The tape head body 202 comprises a first servo head 206A and a second servo head 206B spaced therefrom. It is to be understood that while two servo heads have been shown, the disclosure is not limited to two servo heads. Rather, it is contemplated that more or less servo heads may be present. A plurality of data heads 208A-208G is disposed between the first servo head 206A and the second servo head 206B. It is to be understood that while seven data heads have been shown, the disclosure is not limited to seven data heads. Rather, the number of data heads can be more or less than seven, depending on the requirements of the embodiment. For example there can be sixteen, thirty-two, sixty-four or more data heads utilized in the tape head body 202.

A plurality of pads 220A-220N is electrically coupled to the data head body 202. The plurality of pads 220A-220N coupled to the data head body 202 is not limited to the number shown in FIG. 2. Rather, more or less pads are contemplated. The pads 220A-220N are used to connect the drive electronics to the servo heads 206A, 206B and to data read and writer elements. The pads 220A-220N are used to establish the potential across the servo reader by means of a power supply (not shown) embedded in the tape head 200.

The tape 204 comprises a first servo track 210A and a second servo track 210B. The first servo track 210A and the second servo track 210B are spaced apart allowing the tape head 200 to monitor and control the average position of the data heads 208A-208G relative to the data tracks 212A-212G on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited to the seven data tracks. Rather, the number of data tracks can be more or less than seven, depending on the requirements of the embodiment. In the embodiment of FIG. 2, the first servo head 206A reads its lateral position information (e.g., alignment) over the first servo track 210A. The second servo head 206B is aligned with the second servo track 210B. The combined information allows the servo actuator of the tape drive 200 to align the data heads 208A-208G such that the center data head (e.g., 208D) is centered on tape 204. The plurality of data heads 208A-208G is thus individually aligned with the plurality of data tracks 212A-212G for best case positioning. In this embodiment the first servo head 206A, the second servo head 206B, the first servo track 210A, the second servo track 210B, the plurality of data heads 208A-208G, and the plurality of data tracks 212A-212G are able to read and/or write the data accurately because all are aligned perpendicular to the direction of travel of the tape 204.

Figure 3A:
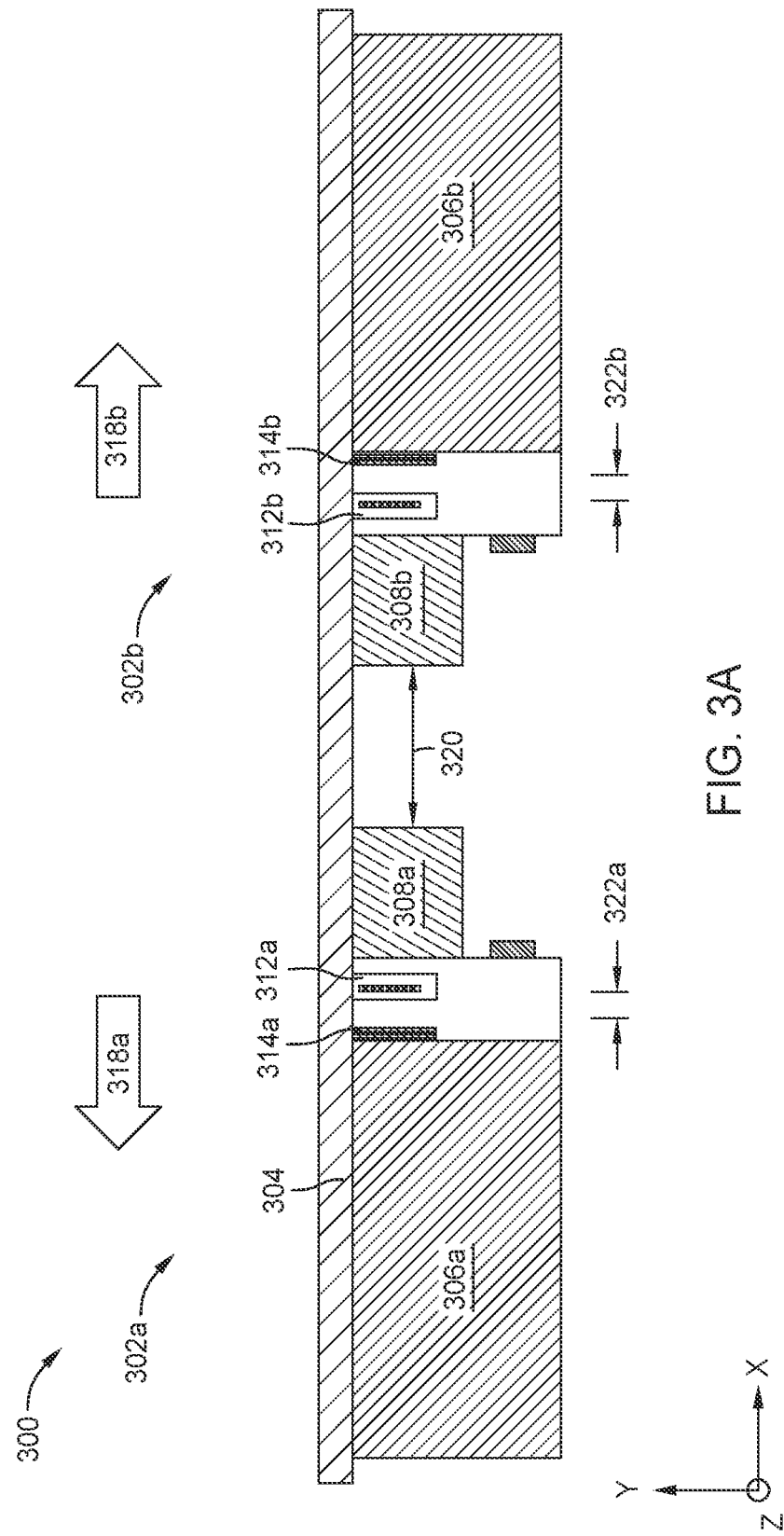
FIG. 3A illustrate illustrates a side view of a tape head comprising two same gap verify (SGV) module head assemblies each configured to write and read verify data, according to one embodiment.

FIG. 3A illustrates a side view of a tape head 300 comprising two same gap verify (SGV) module head assemblies 302a, 302b, according to one embodiment. FIG. 3B illustrate illustrates a media facing surface (MFS) view of the tape head 300 comprising the two SGV module head assemblies 302a, 302b of FIG. 3A, according to one embodiment. FIG. 3C illustrates a write transducer 312 and a read transducer 314 pair of a SGV module 302 of the tape head 300 of FIGS. 3A-3B, according to one embodiment. As used herein, the write transducer(s) may be interchangeably referred to as a writer(s), and the read transducer(s) may be referred to interchangeably as a reader(s).

The tape head 300 may be utilized within a tape drive comprising a controller, such as the TED 100 of FIG. 1A or a tape drive that accepts insertable media. The tape head 300 may be the tape head 200 of FIG. 2. The tape head 300 comprises a first SGV module head assembly 302a and a second SGV module head assembly 302b. The first SGV module head assembly 302a may be referred to as a first SGV module 302a, and the second SGV module head assembly 302b may be referred to as a second SGV module 302b.

As shown in FIG. 3A, the first SGV module 302a comprises a first closure 308a, one or more first write transducers 312a disposed adjacent to the first closure 308a, one or more first read transducers 314a disposed adjacent to the one or more first write transducers 312a, and a first substrate 306a disposed adjacent to the one or more first read transducers 314a. The one or more first write transducers 312a may be referred to herein as one or more first writers 312a, and the one or more first read transducers 314a may be referred to herein as one or more first readers 314a. Each of the one or more first writers 312a and the one or more first readers 314a are disposed on the first substrate 306a. It is noted that while only one first writer 312a and one first reader 314a are shown in the first SGV module 302a of the tape head 300 of FIG. 3A, the first SGV module 302a may comprise one or more first writers 312a and one or more first readers 314a, as described in FIG. 3B below.

Similarly, the second SGV module 302b comprises a second closure 308b, one or more second write transducers 312b disposed adjacent to the second closure 308b, one or more second read transducers 314b disposed adjacent to the one or more second write transducers 312b, and a second substrate 306b disposed adjacent to the one or more second read transducers 314b. The one or more second write transducers 312b may be referred to herein as one or more second writers 312b, and the one or more second read transducers 314b may be referred to herein as one or more second readers 314b. Each of the one or more second writers 312b and the one or more second readers 314b are disposed on the second substrate 306b. It is noted that while only one second writer 312b and one second reader 314b are shown in the second SGV module 302b of the tape head 300 of FIG. 3A, the second SGV module 302b may comprise one or more second writers 312b and one or more second readers 314b, as described in FIG. 3B below.

As discussed further below in FIG. 3C, each of the one or more first writers 312a is spaced a first distance 322a from an adjacent paired first reader 314a, and each of the one or more second writers 312b is spaced a second distance 322b from an adjacent paired second reader 314b. The first distance 322a and the second distance 322b may be the same, or the first distance 322a and the second distance 322b may be different. The first and second writers 312a, 312b may be referred to as a writer 312, either collectively or individually, and the first and second readers 314a, 314b may be referred to as a reader 314, either collectively or individually.

In one embodiment, the first SGV module 302a and the second SGV module 302b are arranged in a face-to-face configuration or arrangement such that the first closure 308a of the first SGV module 302a is disposed adjacent to the second closure 308b of the second SGV module 302b. In other words, the first SGV module 302a is a mirror image of the second SGV module 302b, where the second SGV module 302b is a right hand module and the first SGV module 302a is a left hand module. The first SGV module 302a is spaced a distance 320 from the second SGV module 302b of about 500 µm to about 1000 µm. A MFS of each of the first and second SGV modules 302a, 302b is configured to support or face a tape 304 or other magnetic media. The tape 304 is configured to move over the first and second SGV modules 302a, 302b in both the x-direction and the −x-direction. The first SGV module 302a has a first writing and reading direction 318a that is opposite to a second writing and reading direction 318b of the second SGV module 302b. As discussed further below in FIG. 6, the tape 304 may comprise a soft ferromagnetic underlayer (SUL).

As the tape 304 (either comprising a SUL or not) or other media moves in the first writing and reading direction 318a (i.e., the −x-direction), the one or more first writers 312a of the first SGV module 302a are able to write data to the tape 304, and the one or more first readers 314a are able to immediately read verify the data newly written to the tape 304. Similarly, as the tape 304 or other media moves in the second writing and reading direction 318b (i.e., the x-direction), the one or more second writers 312b of the second SGV module 302b are able to write data to the tape 304, and the one or more second readers 314b are able to immediately read verify the data newly written to the tape 304. As such, both the first SGV module 302a and the second SGV module 302b are individually able to write data to and read verify data from a tape concurrently.

FIG. 3B illustrates a MFS view of a SGV module head assembly 302 of the tape head 300 of FIG. 3A, according to one embodiment. The SGV module 302 of FIG. 3B may be either the first SGV module 302a or the second SGV module 302b of FIG. 3A. Thus, the SGV module 302 may refer to or be used interchangeably with either the first SGV module 302a or the second SGV module 302b of FIG. 3A.

The SGV module 302 shown in FIG. 3B comprises a plurality of writers 312 and a plurality of readers 314 forming a plurality of writer 312 and reader 314 pairs. The plurality of writers 312 are disposed in a first row 346 in the z-direction adjacent to the closure 308, and the plurality of readers 314 are disposed in a second row 348 in the z-direction between the substrate 306 and the first row 346. Each writer 312 is disposed adjacent to and aligned in the x-direction and in the z-direction with a reader 314 to form a writer 312 and reader 314 pair. In some embodiments, the writer 312 and the reader 314 of each pair are both aligned along a center axis 350 in the x-direction. Each writer 312 is spaced the separation distance 322 from an adjacent reader 314, as discussed further below in FIG. 3C. In other words, the first row 346 of writers 312 is spaced the separation distance 322 in the x-direction from the second row 348 of readers 314.

As used herein, a writer 312 and reader 314 pair refers to a writer 312 and a reader 314 that are disposed adjacent to one another, and are aligned with one another in at least the x-direction and the z-direction. The writer 312 and the reader 314 of each pair may be either aligned or offset from one another in the y-direction. The SGV module 302 further comprises one or more servo read transducers 344, or servo readers 344. The one or more servo readers 344 are aligned in the z-direction with the plurality of readers 314.

While not shown in FIG. 3B, the plurality of writers 312 and readers 314 are spaced apart by a dielectric material, such as alumina, and the electrical connections of each writer 312 and reader 314 are recessed from the MFS in the y-direction. While only eight writer 312 and reader 314 pairs are shown in FIG. 3B, the SGV module may comprise a greater or fewer number of writer 312 and reader 314 pairs. For example, in some embodiments, the SGV module comprises 16 writer 312 and reader 314 pairs. Similarly, while two servo readers 344 are shown in FIG. 3B, the SGV module may comprise a greater or fewer number of servo readers 344, such as two, four, or six servo readers 344. As such, the number of writer 312 and reader 314 pairs and the number of servo readers 344 is not intended to be limiting.

FIG. 3C illustrates a cross-sectional view of a write transducer 312 and a read transducer 314 pair of a SGV module 302 of the tape head 300 of FIGS. 3A-3B, according to one embodiment. The SGV module 302 of FIG. 3C may be either the first SGV module 302a or the second SGV module 302b of FIGS. 3A-3B. The writer 312 and the reader 314 pair shown in FIG. 3C may be a first writer 312a and a first reader 314a pair of the first SGV module 302a or a second writer 312b and a second reader 314b pair of the second SGV module 302b of FIGS. 3A-3B. As such, the writer 312 may refer to or be used interchangeably with either a first writer 312a of the first SGV module 302a or a second writer 312b of the SGV module 302b, and the reader 314 may refer to or be used interchangeably with either a first reader 314a of the first SGV module 302a or a second reader 314b of the SGV module 302b.

For clarity purposes, it is noted that the writer 312 is disposed to the left of the reader 314, and thus, the writer 312 and reader 314 of FIG. 3C are arranged in the same manner as the second writer 312b and the second reader 314b of the second SGV module 302b of FIGS. 3A-3B. However, the writer 312 may instead be disposed to the right of the reader 314 to be arranged in the same manner as the first writer 312a and the first reader 314a of the first SGV module 302a of FIGS. 3A-3B. As such, the arrangement of the writer 312 and the reader 314 in FIG. 3C is not intended to be limiting.

It is further noted that while only one writer 312 and reader 314 pair are shown in the SGV module 302 of the tape head 300 of FIG. 3C, the tape head 300 comprises one or more writers 312 and one or more readers 314 to form one or more writer 312 and reader 314 pairs, as discussed above in FIG. 3B. In such embodiments, the additional writer 312 and reader 314 pairs are disposed in front of (i.e., the z-direction) and/or behind (i.e., the −z-direction) the writer 312 and reader 314 pair shown in FIG. 3C.

The writer 312 comprises a write pole 330 coupled to a curved return pole 332. A plurality of coils 334 are disposed between the write pole 330 and the return pole 332. The write pole 330 is spaced from the return pole 332 at a MFS by a write gap 328. The write pole 330 has a first height 324 in the y-direction. The reader 314 comprises a first shield 336, a second shield 338, and a magnetic sensor 340 disposed between the first and second shields 336, 338. The magnetic sensor 340 may be a tunnel magnetoresistance (TMR) sensor, for example. The first and second shields 336, 338 each have a second height 326 in the y-direction. In one embodiment, the second height 326 is about equal to the first height 324. In another embodiment, the second height 326 is greater than the first height 324.

It is noted that in the schematics of FIGS. 3C and 4B, a ring head with a pancake write coil is shown. However, the SGV module 302 is not limited to the fine structure of the writing pole tip at the MFS, but is equally applicable to a single pole head with a SUL or other structures (e.g., microwave or heat-assisted recording). Furthermore, the coil structure could be single, double, or triple pancake or helical.

The writer 312 is spaced from a paired reader 314 a separation distance 322 in the x-direction. Specifically, the write pole 330 of the writer 312 is spaced from the first shield 336 of the reader 314 the distance 322 in the x-direction. In one embodiment, the distance 322 is greater than or equal to 20% (i.e., about one-fifth) of the first height 324. In another embodiment, the distance 322 is greater than or equal to about 20% (i.e., about one-fifth) of the second height 326. For example, if the first height 324 and/or the second height 326 is about 5 μm to about 100 μm, the distance 322 is between about 3 μm to about 20 μm.

When writing data to a tape 304 (either comprising a SUL or not) or other media, the tape 304 moves over the writer 312 in the writing and reading direction 318b (e.g., in the x-direction). Due at least in part to the separation distance 322 between the write pole 330 and the first shield 336 of a writer 312 and reader 314 pair, the writer 312 is able to write to the tape 304 or other media, and the reader 314 is able to read the data to verify the data was written correctly. A magnetic shield (not shown) may be used to further reduce magnetic cross-talk between the writer 312 and the reader 314, as well as reader shields and coil design optimizations. Thus, the writer 312 is able to write data to a portion of the tape, and the paired reader 314 is able to read verify the newly written portion of the tape immediately. As such, the SGV module(s) 302 is able to write data to and read verify data from a tape concurrently.

The SGV module(s) 302 is able to concurrently write and read data due in part to the separation distance 322 between the write gap write pole 330 and the first shield 336 of a writer 312 and reader 314 pair. The write pole 330 and the first shield 336 are spaced far enough apart that the amplitude of signals in the reader 314 that arise from coupling of magnetic flux from the paired writer 312 is reduced or substantially less than the readback signal of the reader 314 itself. By spacing the writer 312 from the reader 314 by the separation distance 322 (i.e., greater than or equal to 20% of the first height 324 or the second height 326), and by adjusting magnetic design parameters, such as magnetic shield dimensions, write transducer coil design, and optionally deploying additional shielding between the read and write transducers 314, 312, a ratio of read signal to coupled writer signal amplitudes (e.g., signal to cross-talk ratio (SXR)) greater than about 20 dB or about 30 dB may be achieved.

Moreover, referring back to FIG. 3A, the tape head 300 is controllable such that the first SGV module 302a is able to write data to the tape 304 and the second SGV module 302b is able to read verify the data, or vice versa. However, both the first and second SGV modules 302a, 302b are able to independently write data to the tape 304 and to read verify the data without utilizing the other SGV module 302a, 302b. In other words, the first writer 312a of the first SGV module 302a is able to write data to the tape 304 and the first reader 314a is able to read verify the newly written data, and the second writer 312b of the second SGV module 302b is able to write data to the tape 304 and the second reader 314b is able to read verify the newly written data. Thus, the first writer 312a and the first reader 314a of the first SGV module 302a may be used concurrently to write data to and read data from the tape 304, and the second writer 312b and the second reader 314b of the second SGV module 302b may be used concurrently to write data to and read data from the tape 304.

As used herein, the SGV module(s) 302 being able to "concurrently" write and read data refers to the fact that both the writer 312 and the reader 314 are concurrently turned "on" or able to operate simultaneously with respect to various data written to a tape 304. However, it is to be noted that the writer 312 and the reader 314 are not "concurrently" operating on the same data at the same time. Rather, the writer 312 first writes data, and as the tape moves over the reader 314, the reader 314 is then able to read verify the newly written data as the writer 312 concurrently writes different data to a different portion of the tape. Furthermore, it is to be noted that a controller (not shown) is configured to operate the SGV module(s) 302, and as such, the controller is configured to independently operate both the writer 312 and the reader 314. Thus, while the writer 312 is described as writing data and the reader 314 is described as reading the data, the controller enables the writer 312 to write and enables the reader 314 to read.

FIGS. 4A-4B illustrate a conventional tape head 400 comprising a plurality of write transducers 412 (writers 412) and read transducers 414 (readers 414) being spaced apart a distance 422 less than 1 μm, according to one embodiment. The conventional tape head 400 is shown and described for comparison purposes.

The conventional tape head 400 comprises one or more modules 402. As shown in FIG. 4A, each module 402 of the conventional tape head 400 comprises a closure 408, one or more write transducers 412 disposed adjacent to the closure 408, one or more read transducers 414 disposed adjacent to the one or more write transducers 412, and a substrate 406 disposed adjacent to the one or more read transducers 414. The readers 414 are disposed between one or more servo readers 444. The writers 412 and the readers 414 are spaced a distance (shown in FIG. 4B) apart in the x-direction of less than 1 μm.

As shown in FIG. 4B, each writer 412 of the conventional tape head 400 comprises a write pole 430 coupled to a return pole 432. A plurality of coils 434 are disposed between the write pole 430 and the return pole 432. The write pole 430 is spaced from the return pole 432 at a MFS by a write gap 428. Each reader 414 of the conventional tape head 400 comprises a first shield 436, a second shield 438, and a magnetic sensor 440 disposed between the first and second shields 436, 438. The first shield 436 of the reader 414 is disposed a distance 422 less than 1 μm from the write pole 430.

Due to the distance 422 between the first shield 436 and the write pole 430 being less than 1 μm, cross-talk is generated between the writer 412 and the reader 414, and the conventional tape head 400 is unable to write data to the tape 404 using the writer 412 and to read data written to the tape 404 by the writer 412 using the reader 414. In other words, the writer 412 and the reader 414 of the conventional tape head 400 cannot be used concurrently, and must be used individually. As such, an individual module 402 of the conventional tape head 400 alone cannot write and read verify data. Rather, several modules 402 must be utilized to allow a writer 412 of a first module 402 to write data to a tape 404 while a reader 414 of a second module 402 read verifies the data, or vice versa.

FIGS. 5A-5D illustrate various stages of forming a SGV module head assembly 302 of the tape head 300 of FIGS. 3A-3C, according to various embodiments. The SGV module 302 of FIGS. 5A-5D may be the first SGV module 302a or the second SGV module 302b of FIG. 3A-3B, or the SGV module 302 FIG. 3C. It is noted that FIGS. 5A-5D have been simplified or exaggerated for clarity, and aspects of the formation process may not be shown in entirety.

As shown in FIG. 5A, a first dielectric layer 552a, such as alumina, is deposited on the substrate 306, and the second shield 338 of the reader 314 is disposed over a portion of the first dielectric layer 552a at the MFS. A top surface 554a of the first dielectric layer 552a and the second shield 338 is then polished or planarized to be substantially flat using chemical mechanical polishing (CMP).

In FIG. 5B, a lead 556 is disposed over the top surface 554a of the first dielectric layer 552a and a portion of the second shield 338. The lead 556 is recessed from the MFS and extends in the −y-direction away from the MFS. A first electrical stud 558a is deposited over a portion of the lead 556 recessed from both the MFS and the second shield 338. The lead 556 is coupled to the first electrical stud 558a and the second shield 338 to form an electrical connection for the reader 314. The first electrical stud 558a is plated to have an initial height 564 in the x-direction greater than a target height 562 (shown by the dotted line 566) of the first electrical stud 558a. A second dielectric layer 552b, such as alumina, is deposited over the second shield 338, the lead 556, and the first electrical stud 558a. The second dielectric layer 552b has an initial thickness 568 in the x-direction greater than a target thickness 570 (shown by the dotted line 566).

While not shown in FIG. 5B, the first shield 336 of the reader 314 further comprises a lead and an electrical stud, similar to the lead 556 and the first electrical stud 558a. The lead and the electrical stud coupled to the first shield 336 are disposed adjacent to the lead 556 and the first electrical stud 558a coupled to the second shield 338 in the z-direction, and the lead and the electrical stud coupled to the first shield 336 may be deposited simultaneously as the lead 556 and the first electrical stud 558a coupled to the second shield 338.

Figure 5C:
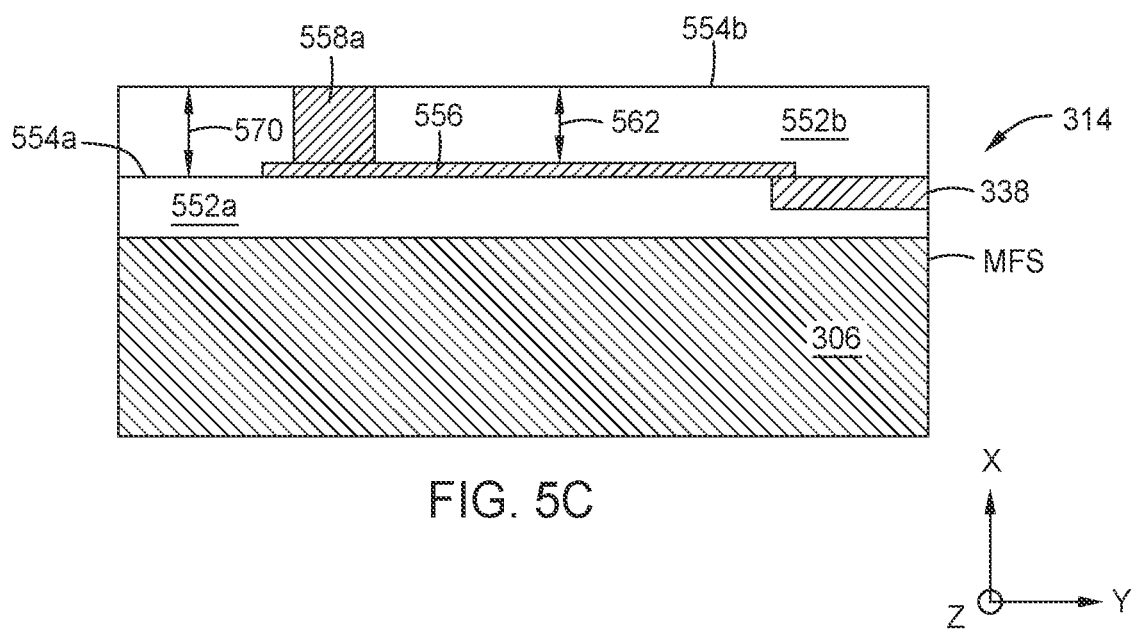

In FIG. 5C, the first electrical stud 558a (as well as the electrical stud not shown coupled to the first shield 336) and the second dielectric layer 552b are then polished using CMP to the target height 562 and the target thickness 570, respectively, such that the second dielectric layer 552b and the first electrical stud 558a form a substantially flat surface 554b. The process is then repeated one or more times as the magnetic sensor 340, the first shield 336, and the writer 312 are formed (as shown in FIG. 5D).

Figure 5D:
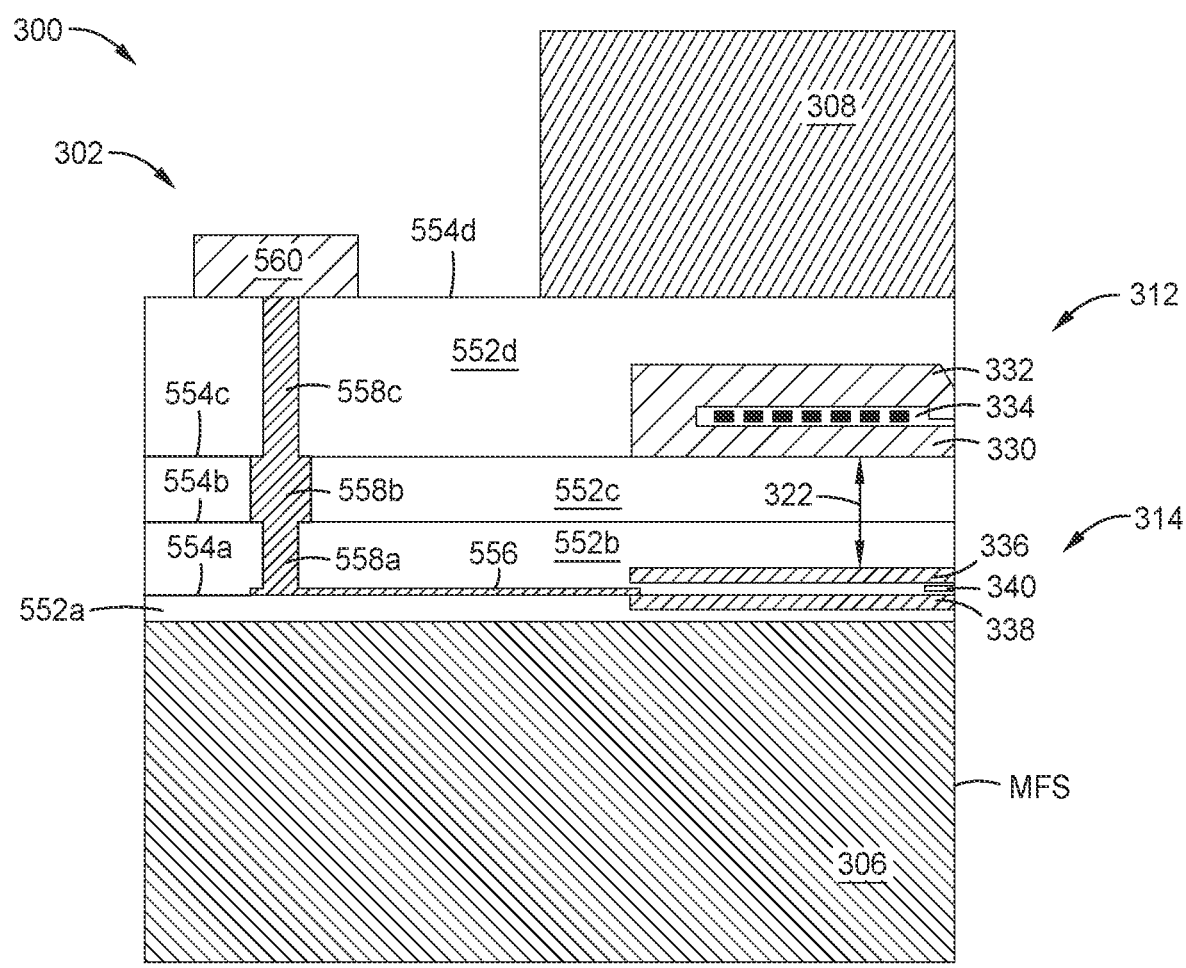

For example, as shown in FIG. 5D, a third dielectric layer 552c, such as alumina, is deposited over the second dielectric layer 552b, and a second electrical stud 558b is disposed over and connected to the first electrical stud 558a. The third dielectric layer 552c and the second electrical stud 558b are then polished using CMP to form a substantially flat surface 554c. The third dielectric layer 552c may be a composite of multiple CMP processes in order to achieve the desired separation distance 322 and to allow other electrical features not shown to be included. The writer 312 is then disposed over the third dielectric layer 552c at the MFS, and a fourth dielectric layer 552d, such as alumina, is deposited adjacent to the writer 312 on the third dielectric layer 552c. A third electrical stud 558c is disposed over and connected to the second electrical stud 558b.

While not shown, each of the first, second, third, and fourth dielectric layer 552a-552d may individually comprise one or more dielectric layers, where each of the one or more dielectric layers (or portions of the first, second, third, and fourth dielectric layer 552a-552d) may be individually deposited and polished using CMP as the various components of the writer 312 and/or reader 314 are formed or deposited. For example, the write pole 330 and a first portion of the fourth dielectric layer 552d may be deposited and polished using CMP, the coil 334 and a second portion of the fourth dielectric layer 552d may be deposited and polished using CMP, and the return pole 332 and a third portion of the fourth dielectric layer 552d may be deposited and polished using CMP. Additionally, each dielectric layer 552a-552d may undergo multiple CMP processes. For example, the third dielectric layer 552c may undergo multiple CMP processes in order to achieve the desired separation distance 322 and to allow other electrical features not shown to be included.

The fourth dielectric layer 552d and the third electrical stud 558c are then polished using CMP to form a substantially flat surface 554d. An electrical contact 560 is deposited in contact with the third electrical stud 558c on the substantially flat surface 554d of the fourth dielectric layer 552d and the third electrical stud 558c recessed from the MFS. The first, second, and third electrical studs 558a-558c couple the electrical contact 560 to the reader 314 through the lead 556. The closure 308 is disposed adjacent to the electrical contact 560 on the substantially flat surface 554d at the MFS. The multiple CMP processes performed enable the reader 314 to be spaced the separation distance 322 from the writer 312, allowing the SGV module 302 to write and read verify data, as discussed above.

As noted above, the tape head 300 of FIGS. 3A-3C comprising the SGV module head assembly 302 is able to write and read verify data to a tape 304 or other magnetic media whether the tape 304 comprises a soft ferromagnetic underlayer (SUL) or not. However, the separation distance 322 between the write pole 330 of the writer 312 and the first shield 336 of the reader 314 may vary depending on whether the tape 304 comprises a SUL or not.

Figure 6:
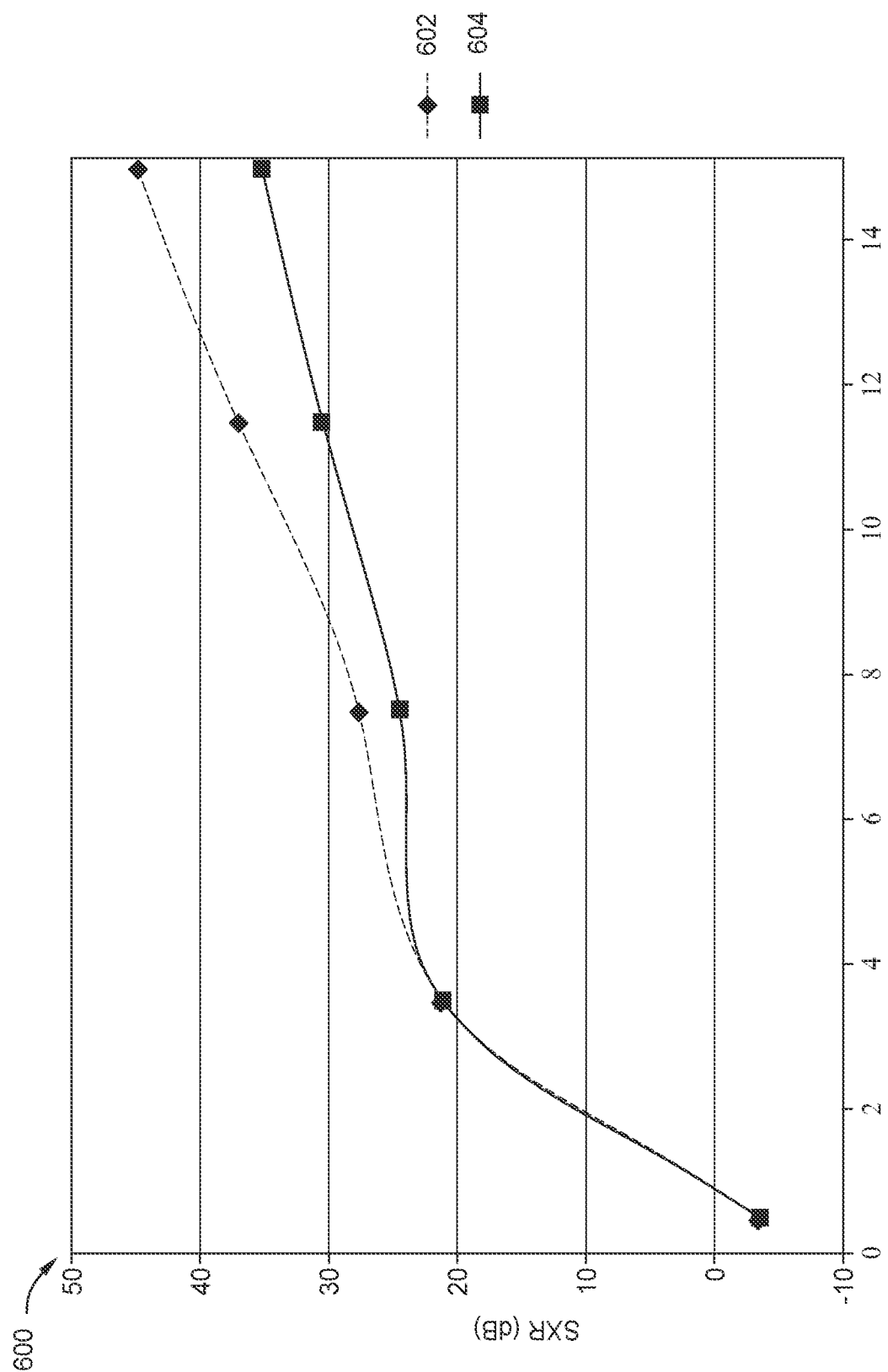
FIG. 6 illustrates a graph of signal to cross-talk ratio (SXR) versus the distance between the write transducer and the read transducer of the SGV module of the tape head of FIGS. 3A-3C for a tape with a soft ferromagnetic underlayer (SUL) and for a tape without a SUL, according to one embodiment.

FIG. 6 illustrates a graph 600 of signal to cross-talk ratio (SXR) in dB versus the distance 322 in μm between the write pole 330 of the writer 312 and the first shield 336 of the reader 314 of the SGV module 302 of the tape head 300 of FIGS. 3A-3C for a tape with a SUL and for a tape without a SUL, according to one embodiment. In the graph 600, it is assumed the write pole 330 and the first shield 336 each has a height of about 16 μm. Line 602 represents a tape with a SUL and line 604 represents a tape without a SUL.

As shown by line 602 for a tape with a SUL, the minimum SXR of about 20 dB (e.g., verified >1 dB margin) can be achieved when the distance 322 between the write pole 330 and the first shield 336 is about 3.4 μm. A SXR of about 30 dB (e.g., verified >0.1 dB margin) can be achieved when the distance 322 between the write pole 330 and the first shield 336 is about 8.6 μm. A SXR of about 40 dB (e.g., verified without margin) can be achieved when the distance 322 between the write pole 330 and the first shield 336 is greater than or equal to about 15 μm.

Similarly, as shown by line 604 for a tape without a SUL, the minimum SXR of about 20 dB (e.g., verified >1 dB margin) can be achieved when the distance 322 between the write pole 330 and the first shield 336 is about 3.4 μm. A SXR of about 30 dB (e.g., verified >0.1 dB margin) can be achieved when the distance 322 between the write pole 330 and the first shield 336 is about 11.2 μm. A SXR of about 40 dB (e.g., verified without margin) can be achieved when the distance 322 between the write pole 330 and the first shield 336 is about 12.8 μm.

As such, the SGV module 302 of the tape head 300 of FIGS. 3A-3C is able to write and read verify data, or write and read data concurrently, for a tape with a SUL and for a tape without a SUL. When writing and reading data from a tape with a SUL or from a tape without a SUL, the write pole 330 of the writer 312 having a height of about 16 μm and the first shield 336 of the reader 314 having a height of about 16 μm should be spaced a separation distance 322 apart of at least 3.4 μm in order to write and read verify data. In other words, so long as the distance 322 is greater than or equal to 20% (i.e., about one-fifth) of the write pole 330 height and/or the first shield 336 height, the SGV module is able to write and read verify data, or write and read data concurrently, for a tape with a SUL and for a tape without a SUL.

Therefore, a SGV module head assembly of a tape head comprising a plurality of writer and reader pairs, the write pole of the writer and the first shield of the reader of each pair being spaced apart a distance greater than or equal to about 20% of the write pole height, enables the SGV module to write data to a portion of a tape or media (with or without a SUL), and to immediately read verify the newly written portion of the tape. As such, the SGV module is able to write data to and read verify data from a tape concurrently.

In one embodiment, a SGV module head assembly comprises a substrate and a plurality of write transducer and read transducer pairs disposed on the substrate, each write transducer and read transducer pair comprising a write transducer and a read transducer, wherein: each write transducer comprises a write pole having a first height in a first direction from a media facing surface, each read transducer comprises a first shield disposed adjacent to the write pole, a second shield, and a magnetic sensor disposed between the first and second shields, and the write pole and the first shield of each pair are spaced a first distance in a second direction perpendicular to the first direction greater than or equal to about 20% of the first height such that the SGV module head assembly is controllable to write first data to a tape using the write transducer of each pair and read verify the first data using the read transducer of each pair.

The tape comprises a soft ferromagnetic underlayer, or the tape is without a soft ferromagnetic underlayer. The first height is between about 5 μm to about 100 μm. The first distance is between about 3 μm to about 20 μm. The SGV module head assembly is controllable to concurrently write second data to and read third data from the tape using the plurality of write transducer and read transducer pairs. A tape drive comprises the SGV module head assembly and a controller configured to control the SGV module head assembly to write data to the tape using the write transducer of each pair and read verify the data using the read transducer of each pair.

In another embodiment, a tape head comprises a first SGV module head assembly comprising: a plurality of first write transducers disposed in a first row on a substrate, each first write transducer comprising a write pole having a first height in a first direction, and a plurality of first read transducers disposed in a second row adjacent to the first row on the substrate, each first read transducer comprising a first shield having a second height in the first direction from a media facing surface, a second shield, and a magnetic sensor disposed between the first and second shield, wherein: each first write transducer of the plurality of first write transducers is paired with an adjacent first read transducer of the plurality of first read transducers to form a plurality of first write transducer and first read transducer pairs, in each first write transducer and first read transducer pair, the write pole is disposed adjacent to and spaced from the first shield a first distance in a second direction perpendicular to the first direction, and the first distance is greater than or equal to about one-fifth of the second height such that the first SGV module head assembly is controllable to write first data to a tape using the first write transducer of each pair and read verify the first data using the first read transducer of each pair.

The tape comprises a soft ferromagnetic underlayer, and the first distance is between about 3 µm to about 20 µm. The tape is without a soft ferromagnetic underlayer, and the first distance is between about 3 µm to about 15 µm. The second height is between about 5 µm to about 100 µm, and the first height is less than or equal to the second height.

The tape head further comprises a second SGV module head assembly, comprising: a plurality of second write transducers disposed in a third row on the substrate, each second write transducer comprising a write pole having a third height in the first direction, and a plurality of second read transducers disposed in a fourth row adjacent to the third row on the substrate, each second read transducer comprising a first shield having a fourth height in the first direction, a second shield, and a magnetic sensor disposed between the first and second shield, wherein: each second write transducer of the plurality of second write transducers is paired with an adjacent second read transducer of the plurality of second read transducers to form a plurality of second write transducer and second read transducer pairs, in each second write transducer and second read transducer pair, the write pole is disposed adjacent to and spaced from the first shield a second distance in the second direction, and the second distance is greater than or equal to about one-fifth of the third height such that the second SGV module head assembly is controllable to write second data to the tape using the second write transducer of each pair and read verify the second data using the second read transducer of each pair.

A tape drive comprises the tape head comprising the first and second SGV module head assemblies and a controller configured to: control the first SGV module head assembly to concurrently write third data to and read fourth data from the tape using the plurality of first write transducer and first read transducer pairs, and control the second SGV module head assembly to concurrently write fifth data to and read sixth data from the tape using the plurality of second write transducer and second read transducer pairs.

A tape drive comprises the tape head comprising the first SGV module head assembly and a controller configured to control the first SGV module head assembly to write data to the tape using the plurality of first write transducers and read verify the data using the plurality of first read transducers.

In yet another embodiment, a method of forming a SGV module head assembly comprises depositing a first dielectric layer over a substrate, polishing the first dielectric layer a first substantially flat surface, forming a read transducer at a media facing surface over the first substantially flat surface, depositing one or more second dielectric layers over the read transducer, polishing the one or more second dielectric layers to form a second substantially flat surface, and forming a write transducer at the media facing surface on the second substantially flat surface at the media facing surface, wherein the SGV module head assembly is controllable to write data to a tape using the write transducer and to read verify the data using the read transducer.

Forming the read transducer comprises: depositing a first shield of the read transducer over a portion of the first dielectric layer, wherein polishing the first dielectric layer comprises polishing the first shield to form the first substantially flat surface, forming an electrical lead on the first substantially flat surface, the electrical lead being disposed in contact with a portion of the first shield and recessed from a media facing surface, forming a first electrical stud in contact with a portion of the electrical lead spaced from the first shield, forming a magnetic sensor and a second shield of the read transducer over the electrical lead and the first electrical stud, and forming a second electrical stud in contact with the first electrical stud.

The method further comprises forming a third electrical stud in contact with the second electrical stud, depositing one or more third dielectric layers over the write transducer and the third electrical stud, and polishing the one or more third dielectric layers and the third electrical stud to form a third substantially flat surface. The method further comprises forming an electrical contact on the third substantially flat surface in contact with the third electrical stud, and depositing a closure on the third substantially flat surface adjacent to the electrical contact, the closure being disposed at the media facing surface.

The write transducer comprising a write pole, a return pole, and a coil, the write pole having a first height in a first direction perpendicular to the media facing surface. The write pole of the write transducer and the second shield of the read transducer are spaced apart a distance in a second direction parallel to the media facing surface greater than or equal to about 20% of the first height of the write pole. The first height is between about 5 µm to about 50 µm, and wherein the distance is between about 3 µm to about 20 µm. The first and second shields each has a second height in a first direction perpendicular to the media facing surface. A write pole of the write transducer and the second shield of the read transducer are spaced apart a distance in a second direction parallel to the media facing surface greater than or equal to about 20% of the second height of the first and second shields.

While the foregoing is directed to embodiments of the present disclosure, other and further embodiments of the disclosure may be devised without departing from the basic scope thereof, and the scope thereof is determined by the claims that follow.

What is claimed is:

1. A same gap verify (SGV) module head assembly, comprising:
    a substrate; and
    a plurality of write transducer and read transducer pairs disposed on the substrate, each write transducer and read transducer pair comprising a write transducer and a read transducer,
    wherein:
        each write transducer comprises a write pole having a first height in a first direction from a media facing surface,
        each read transducer comprises a first shield disposed adjacent to the write pole, a second shield, and a magnetic sensor disposed between the first and second shields,
        dielectric material extends from the write pole to the first shield, and
        the write pole and the first shield of each pair are spaced a first distance in a second direction perpendicular to the first direction greater than or equal to about 20% of the first height such that the SGV module head assembly is controllable to write first data to a tape using the write transducer of each pair and read verify the first data using the read transducer of each pair.

2. The SGV module head assembly of claim 1, wherein the first height is between about 5 µm to about 100 µm.

3. The SGV module head assembly of claim 1, wherein the first distance is between about 3 μm to about 20 μm.

4. The SGV module head assembly of claim 1, wherein the SGV module head assembly is controllable to concurrently write second data to and read third data from the tape using the plurality of write transducer and read transducer pairs.

5. A tape drive, comprising:
the SGV module head assembly of claim 1; and
a controller configured to control the SGV module head assembly to write data to the tape using the write transducer of each pair and read verify the data using the read transducer of each pair.

6. The tape drive of claim 5, wherein the tape comprises a soft ferromagnetic underlayer.

7. The tape drive of claim 5, wherein the tape is without a soft ferromagnetic underlayer.

8. A tape head, comprising:
a first same gap verify (SGV) module head assembly, comprising:
  a plurality of first write transducers disposed in a first row on a first substrate, each first write transducer comprising a write pole having a first height in a first direction from a media facing surface; and
  a plurality of first read transducers disposed in a second row adjacent to the first row on the first substrate, each first read transducer comprising a first shield having a second height in the first direction, a second shield, and a magnetic sensor disposed between the first and second shields,
wherein:
  each first write transducer of the plurality of first write transducers is paired with an adjacent first read transducer of the plurality of first read transducers to form a plurality of first write transducer and first read transducer pairs,
  in each first write transducer and first read transducer pair, the write pole is disposed adjacent to and spaced from the first shield a first distance in a second direction perpendicular to the first direction,
  dielectric material extends the first distance from the write pole to the first shield, and
  the first distance is greater than or equal to about one-fifth of the second height such that the first SGV module head assembly is controllable to write first data to a tape using the first write transducer of each pair and read verify the first data using the first read transducer of each pair.

9. The tape head of claim 8, wherein the tape comprises a soft ferromagnetic underlayer, and wherein the first distance is between about 3 μm to about 20 μm.

10. A tape drive comprising the tape head and tape of claim 9.

11. The tape head of claim 8, wherein the tape is without a soft ferromagnetic underlayer, and wherein the first distance is between about 3 μm to about 15 μm.

12. A tape drive comprising the tape head and tape of claim 11.

13. The tape head of claim 8, wherein the second height is between about 5 μm to about 100 μm, and wherein the first height is less than or equal to the second height.

14. The tape head of claim 8, further comprising:
a second SGV module head assembly, comprising:
  a plurality of second write transducers disposed in a third row on a second substrate, each second write transducer comprising a write pole having a third height in the first direction; and
  a plurality of second read transducers disposed in a fourth row adjacent to the third row on the second substrate, each second read transducer comprising a first shield having a fourth height in the first direction, a second shield, and a magnetic sensor disposed between the first and second shield,
wherein:
  each second write transducer of the plurality of second write transducers is paired with an adjacent second read transducer of the plurality of second read transducers to form a plurality of second write transducer and second read transducer pairs,
  in each second write transducer and second read transducer pair, the write pole is disposed adjacent to and spaced from the first shield a second distance in the second direction, and
  the second distance is greater than or equal to about one-fifth of the third height such that the second SGV module head assembly is controllable to write second data to the tape using the second write transducer of each pair and read verify the second data using the second read transducer of each pair.

15. A tape drive, comprising:
the tape head of claim 14; and
a controller configured to:
  control the first SGV module head assembly to concurrently write third data to and read fourth data from the tape using the plurality of first write transducer and first read transducer pairs; and
  control the second SGV module head assembly to concurrently write fifth data to and read sixth data from the tape using the plurality of second write transducer and second read transducer pairs.

16. A tape drive, comprising:
the tape head of claim 8; and
a controller configured to control the first SGV module head assembly to write data to the tape using the plurality of first write transducers and read verify the data using the plurality of first read transducers.

17. A tape drive, comprising:
one or more same gap verify (SGV) module head assemblies, each SGV module head assembly comprising:
  a substrate; and
  a plurality of write transducer and read transducer pairs disposed on the substrate, each write transducer and read transducer pair comprising a write transducer and a read transducer,
wherein:
  each write transducer comprises a write pole,
  each read transducer comprises a first shield disposed adjacent to the write pole, a second shield, and a magnetic sensor disposed between the first and second shields,
  the first shield has a first height in a first direction from a media facing surface,
  dielectric material extends from the write pole to the first shield, and the write pole and the first shield of each pair are spaced a first distance in a second direction perpendicular to the first direction greater than or equal to about 20% of the first height, and
a controller coupled to each of the one or more SGV module head assemblies, the controller configured to:
  control the write transducer of each pair to write data to a tape; and
  control the read transducer of each pair to read verify the data.

18. The tape drive of claim 17, wherein the tape comprises a soft ferromagnetic underlayer.

19. The tape drive of claim 17, wherein the tape is without a soft ferromagnetic underlayer.

20. The tape drive of claim 17, wherein the first height is between about 5 µm to about 100 µm.

21. The tape drive of claim 17, wherein the first distance is between about 3 µm to about 20 µm.

\* \* \* \* \*